United States Patent
Moberg et al.

(10) Patent No.: US 8,971,233 B2
(45) Date of Patent: Mar. 3, 2015

(54) RADIO BEARER IDENTIFICATION FOR SELF BACKHAULING AND RELAYING IN LTE ADVANCED

(75) Inventors: Peter Moberg, Stockholm (SE); Niklas Johansson, Sollentuna (SE); Gunnar Mildh, Sollentuna (SE); András Rácz, Budapest (HU); Magnus Stattin, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 285 days.

(21) Appl. No.: 13/257,540

(22) PCT Filed: Oct. 9, 2009

(86) PCT No.: PCT/SE2009/051136
§ 371 (c)(1),
(2), (4) Date: Sep. 19, 2011

(87) PCT Pub. No.: WO2010/107357
PCT Pub. Date: Sep. 23, 2010

(65) Prior Publication Data
US 2012/0020278 A1 Jan. 26, 2012

Related U.S. Application Data

(60) Provisional application No. 61/162,057, filed on Mar. 20, 2009.

(51) Int. Cl.
*H04J 1/10* (2006.01)
*H04W 28/06* (2009.01)
(Continued)

(52) U.S. Cl.
CPC ............... *H04W 28/06* (2013.01); *H04B 7/155* (2013.01); *H04W 76/021* (2013.01);
(Continued)

(58) Field of Classification Search
CPC . H04W 76/022; H04W 80/04; H04W 80/045; H04W 76/021; H04W 76/062
USPC .................. 315/315, 329, 331; 455/63.1, 449
See application file for complete search history.

(56) References Cited

U.S. PATENT DOCUMENTS 6,839,339 B1 1/2005 Chuah
2004/0001508 A1* 1/2004 Zheng et al. .................. 370/466
(Continued)

FOREIGN PATENT DOCUMENTS

EP 1973274 A2 9/2008
JP 2001-244993 A 9/2001
(Continued)

OTHER PUBLICATIONS

3rd Generation Partnership Project. "Consideration for Relay." 3GPP TSG RAN WG2 Meeting #65bis, R2-092179, Seoul, Korea, Mar. 23-27, 2009.
(Continued)

*Primary Examiner* — Andrew Chriss
*Assistant Examiner* — Romani Ohri
(74) *Attorney, Agent, or Firm* — Coats and Bennett, PLLC

(57) ABSTRACT

The present invention relates to a method and apparatus for user terminal and bearer identification that reduces the overhead for LTE relaying (layer 2 and layer 3), which will save radio resources on the backhaul link. Reduction in overhead is achieved by providing a more efficient mechanism for user terminal and bearer identification as compared to using GTP-u and associated UDP/IP headers.

8 Claims, 14 Drawing Sheets

(51) Int. Cl.
  H04B 7/155 (2006.01)
  H04W 76/02 (2009.01)
  H04B 7/26 (2006.01)
  H04W 80/00 (2009.01)
  H04W 80/02 (2009.01)
  H04W 84/04 (2009.01)
  H04W 92/20 (2009.01)

(52) U.S. Cl.
  CPC ........... *H04B 7/2606* (2013.01); *H04W 76/022* (2013.01); *H04W 80/00* (2013.01); *H04W 80/02* (2013.01); *H04W 84/047* (2013.01); *H04W 92/20* (2013.01)
  USPC .......... 370/315; 370/329; 370/331; 455/63.1; 455/449

(56) References Cited

U.S. PATENT DOCUMENTS

| | | | |
|---|---|---|---|
| 2004/0062214 A1* | 4/2004 | Schnack et al. | 370/315 |
| 2007/0195764 A1 | 8/2007 | Liu et al. | |
| 2009/0016290 A1* | 1/2009 | Chion et al. | 370/329 |

FOREIGN PATENT DOCUMENTS

| | | |
|---|---|---|
| JP | 2008-289126 A | 11/2008 |
| JP | 2012-507209 A | 3/2012 |
| RU | 2316130 C2 | 1/2008 |
| WO | 03/036886 A2 | 5/2003 |
| WO | 2010048621 A2 | 4/2010 |

OTHER PUBLICATIONS

3rd Generation Partnership Project. "Discussion of User Plane Protocol Stack of Type 1 Relay." 3GPP TSG-RAN WG2 Meeting #65bis, R2-092344, Seoul, Korea, Mar. 23-27, 2009.

3rd Generation Partnership Project. "Discussions on Functionality Partition of Relay in RAN2." 3GPP TSG-RAN WG2 Meeting #65bis, R2-092407, Seoul, Korea, Mar. 23-27, 2009.

3rd Generation Partnership Project. "Considerations on Relay Architecture." 3GPP TSG RAN WG2 #65bis, R2-092425, Seoul, Korea, Mar. 23-27, 2009.

3rd Generation Partnership Project. "Preference for Relay Operation in LTE-A." 3GPP TSG-RAN WG2 #63bis, R3-090702, Seoul, Korea, Mar. 23-27, 2009.

* cited by examiner

RADIO BEARER IDENTIFICATION FOR SELF BACKHAULING AND RELAYING IN LTE ADVANCED

BACKGROUND

The adoption of multi-hop communication has been proposed for Long Term Evolution (LTE) systems to improve the coverage and capacity of LTE networks. In multi-hop cellular systems, communications between the base station and a user terminal (UT) can take multiple hops with the help of additional intermediate nodes. There are different types of intermediate nodes. Repeaters operate at Layer 1 by amplifying the received signal. Relays decode the received transport block before forwarding and request HARQ retransmissions if necessary, thus operating at Layer 2. Self-backhauling is a Layer 3 relaying technique to improve the coverage and data rates of the LTE network. The terms "relay" and "relaying" are used herein to refer to both layer 2 and layer 3 relaying unless otherwise noted.

When relaying is employed, the packets from multiple user terminals are mapped to a common backhaul radio bearer that carries traffic for many user terminals between the base station (eNB) and relay. To enable users to be multiplexed on the backhaul link between base station and relay, it is necessary that the relay, upon packet arrival, deliver the received packets to the correct user in the downlink direction. When tunneling is employed between the base station and the relay, the user bearer is identified from the GTP-u header of the packet. A drawback of this approach is that the header must be transmitted on the backhaul link creating unnecessary overhead on the radio resource. Further, existing header compression mechanisms, such as Robust Header Compression (RoHC) mechanism cannot be applied to reduce the overhead due to GTP tunneling. The overhead from the GTP-u header and associated UDP/IP headers will lead to unnecessary waste of scarce radio resources.

SUMMARY

The present invention relates to a method and apparatus for user terminal and bearer identification that reduces the overhead for LTE relaying (layer 2 and layer 3), which will save radio resources on the backhaul link. Reduction in overhead is achieved by providing a more efficient mechanism for user terminal and bearer identification as compared to using GTP-u and associated UDP/IP headers.

In one of the embodiments, user terminal and bearer identification is enabled by signaling a user terminal and radio bearer identifier in the UP protocol layers (PDCP, RLC and MAC) of the radio link. In this embodiment it is possible to remove the GTP-u and associated UDP/IP headers completely and allow header compression of the end user IP packets directly on the backhaul link.

In a second embodiment, user terminal and bearer identification is enabled by introducing an additional UP protocol layer in the radio link above the Packet Data Convergence Protocol (PDCP) layer that replaces the unnecessary GTP and associated UDP/IP headers with a specific bearer identity field in order to reduce the overhead associated with these headers. This protocol layer may also compress the headers of the end user packets or they could be compressed by the PDCP layer of the backhaul link assuming the bearer identity field can be passed transparently through the header compression.

In a third embodiment, user terminal and bearer identification is enabled by introducing a header compression layer within the GTP tunnel which will compress the end user IP packets. In this embodiment, the GTP-u and associated UDP/IP headers can be used and the overall protocol overhead would still be low, especially if header compression of the UDP/IP layers is used on the backhaul link.

DETAILED DESCRIPTION

Figure 1:
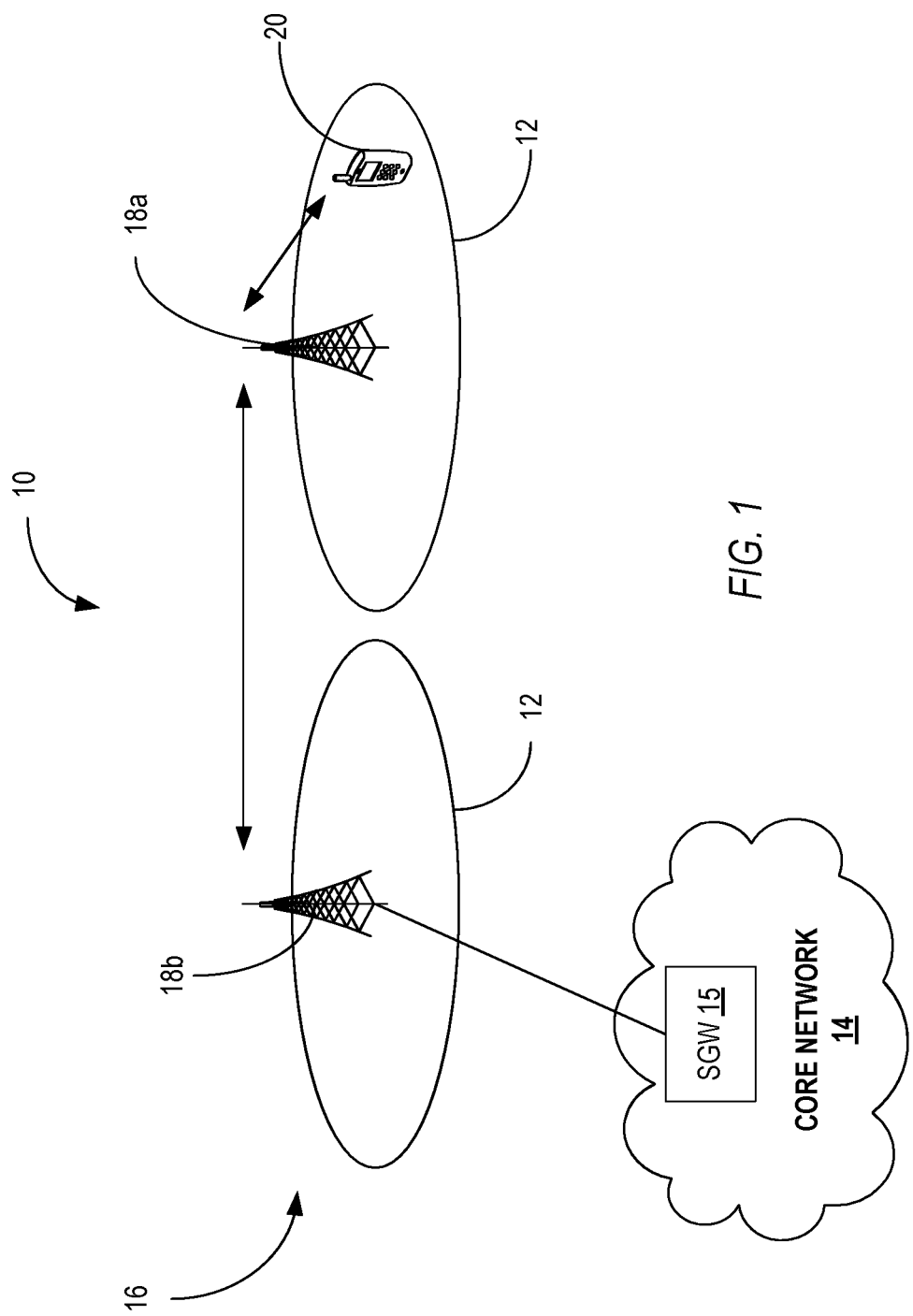
FIG. 1 illustrates an exemplary multi-hop communication system.

FIG. 1 illustrates an exemplary communication network 10 indicated generally by the numeral 10 that employs self-backhauling relaying. Communication network 10 comprises a core network 14 and radio access network 16. The core network 14 includes a serving gateway node (S-GW) 15 provides a connection to a packet data network, such as the Internet. The S-GW 15 routes traffic to and from user terminals 20 operating within the communication network 10. The radio access network 16 comprises a plurality of base stations 18 providing radio coverage in respective cells 12 of the communication network 10. Two base stations 18 are illustrated in the Figures: a self-backhauled base station or some other type of relaying device, referred to herein as the relay 18a, and a donor base station 18b. The relay 18a is wirelessly connected to the core network 14 via the donor base station 18b. The radio technology used for the backhauling link between the relay 18a and donor base station 18b is based on the same radio technology used for communications with the user terminals 20, possibly with some additional extensions to optimize for the backhauling application. As an example, when the donor base station 18b and the relay 18a use LTE radio access for communication with user terminals 20 within the cell, LTE-based, or at least LTE-like, radio link should also be used for the self-backhauling link.

Figure 2:
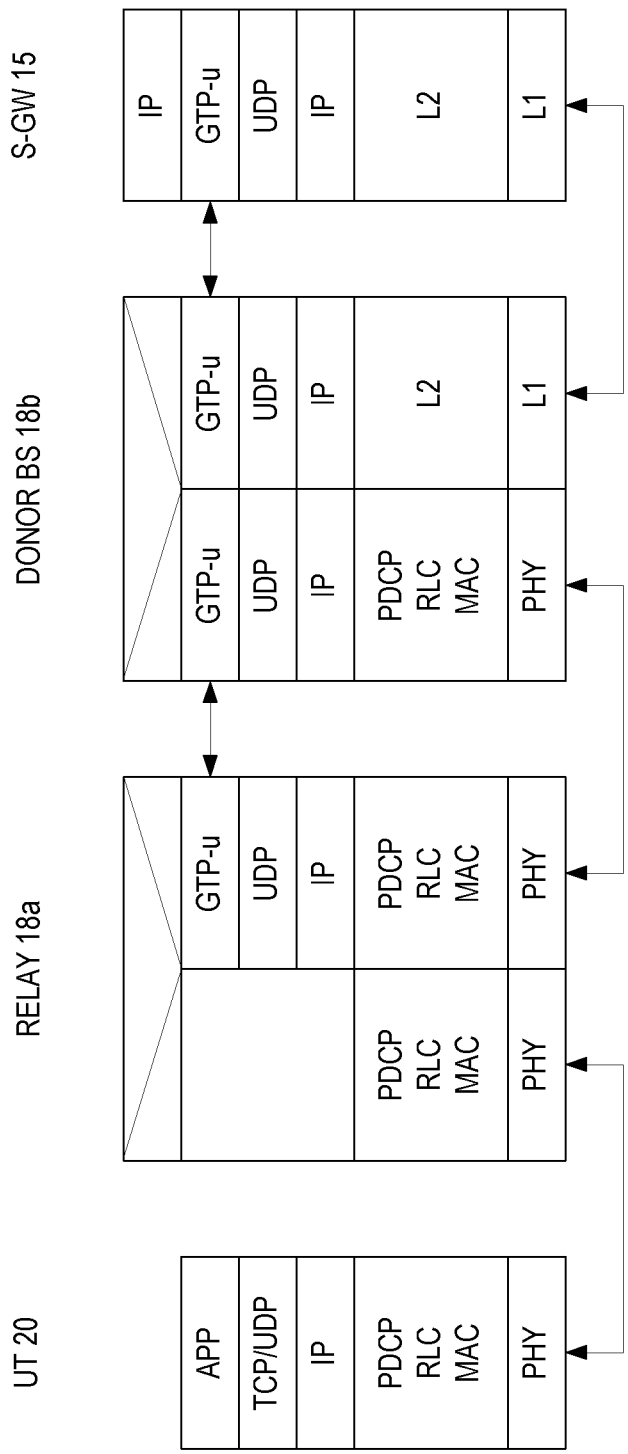
FIG. 2 illustrates an exemplary protocol architecture for a multi-hop communication system.

The present invention provides a method for identifying the user terminal 20 served by a relay 18a via the donor base station 18b for both uplink and downlink communications. To understand the present invention, a brief review of the protocol stack architecture is given below. FIG. 2 illustrates one exemplary end-to-end protocol stack architecture where the donor base station 18b hides the relay 18a from the core network 14. Thus, a user terminal 20 served by the relay 18a is seen from the rest of the network 10 as being served directly via the donor base station 18b. A downlink (DL) transmission can be followed from right to left in FIG. 2. It can be seen that downlink packets for the user terminal 20 are first tunneled from the serving gateway (S-GW) 15 in the core network 14 to the donor base station 18b (downlink), as the S-GW 15 believes that the user terminal 20 is connected to the base station 18b. There is one GTP tunnel per user terminal bearer.

The most straightforward way for the donor base station 18b to forward the packets to the user terminal 20 is to translate the incoming GTP tunnel to an outgoing GTP tunnel toward the relay 18a with a one-to-one mapping, i.e., there is one GTP tunnel per user terminal bearer on the backhaul link as well. The base station 18b maps the packets to a common backhaul radio bearer, i.e., the packets of multiple user terminals 20 are sent on the same radio bearer on the backhaul link. There may be multiple backhaul radio bearers for different QoS classes. After the packets arrive at the relay 18a, the relay 18a maps the packets to the corresponding user terminal radio bearers on the link between the relay 18a and user terminal 20 based on the GTP tunnel ID (TEID).

While the protocol architecture shown in FIG. 2 provides a basis for understanding the present invention, those skilled in the art will appreciate that the principles described are applicable to other realizations of the self-backhauling protocol architecture. The present invention is generally applicable to any alternatives where the donor base station 18b can identify the user terminal bearers to which the incoming packets belong. In order to perform this identification, it is not necessarily required that the GTP tunnels originating from the SGW 15 and belonging to individual user terminal bearers are terminated in the donor base station 18b, as it is shown in the FIG. 2 above. For example, in protocol realizations where the tunnel goes transparently via the donor base station 18b, the base station 18b could identify the user terminal bearers by sniffing into the bypassed tunnel IDs.

During normal data transmission from a base station 18b to a user terminal 20, the user terminal 20 is addressed via the PDCCH (Physical Downlink Control Channel) for both for DL and UL transmissions. When data is sent between donor base station 18b and relay 18a, it is beneficial to address the relay 18a instead of the individual user terminals 20 on the PDCCH. Otherwise, a PDCCH allocation would have to be transmitted separately for each user terminal 20, which is not acceptable because the PDCCH is expected to be a limited resource in an LTE system.

For the forwarding solution shown in FIG. 2, the base station 18b maps the packets from multiple user terminals 20 to a common backhaul radio bearer. The relay 18a must be able to deliver the received packets to the correct user terminal 20. The user terminal and the corresponding radio bearer may be identified based on the GTP tunnel ID. To enable user terminals 20 to be multiplexed on the backhaul link between base station 18b and relay 18a, it is necessary that the relay 18a, upon packet arrival, associate the received packets with the correct user terminal 20. One solution is to determine the user terminal identity from the GTP-u header of the packets received from the S-GW 15. A drawback of this approach is that the header must be transmitted on the backhaul link and thus create unnecessary overhead on the radio resource. Further, no Robust Header Compression (RoHC) mechanism is applied to the overhead bits. The overhead from the GTP-u header and associated UDP/IP headers will therefore lead to unnecessary waste of scarce radio resources.

The present invention reduces the overhead for LTE relaying (layer 2 and layer 3), by providing a more efficient mechanism for user terminal and bearer identification as compared to using GTP-u and associated UDP/IP headers. The resulting reduction in overhead saves radio resources on the backhaul link.

Figure 3:
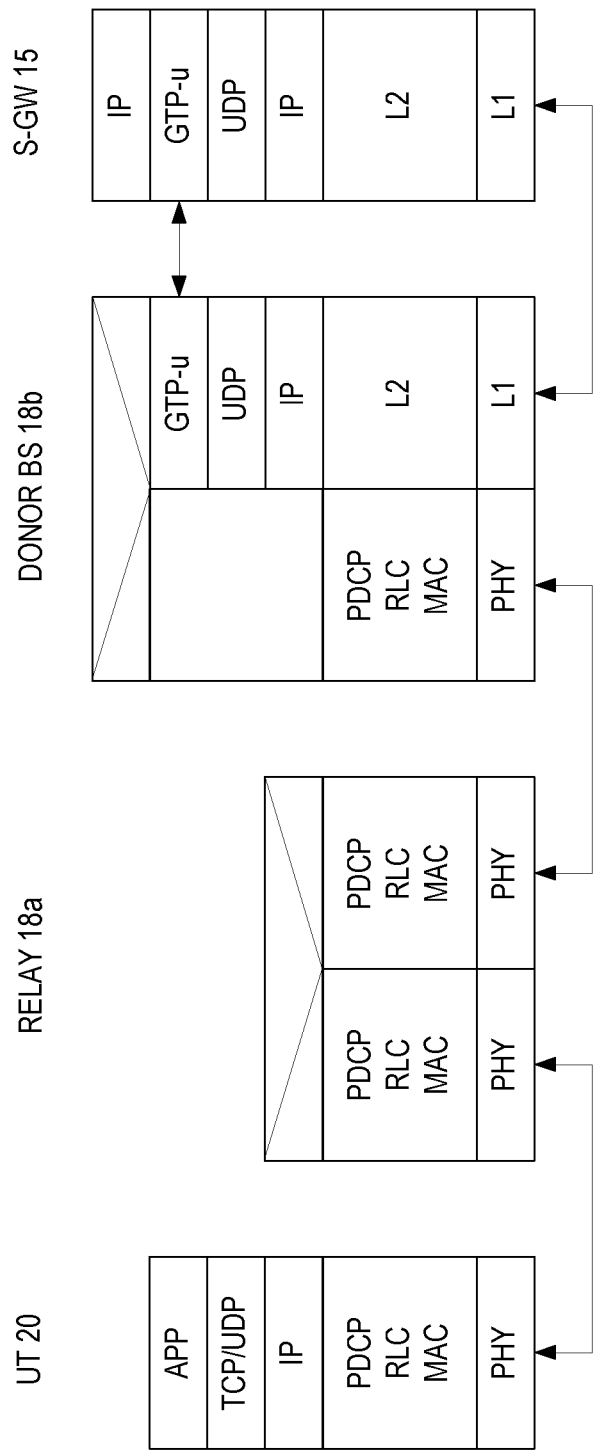
FIG. 3 illustrates an exemplary protocol architecture for a multi-hop communication system wherein user-specific bearer information is contained in a radio link protocol layer such as the PDCP, RLC, or MAC layer.

In a first embodiment illustrated in FIG. 3, user terminal and bearer identification is enabled by including a user terminal and bearer identifier in one of the user plane (UP) protocol layers (PDCP, RLC and MAC) on the radio link between the donor base station 18b and relay 18a. For convenience, the UP protocol layers on the radio link are referred to herein as the radio link protocol layers, as these layers are specified by the applicable air interface specification. In the first embodiment, the GTP tunnel is terminated at the donor base station 18b. The donor base station 18b removes the GTP-u and associated UDP/IP headers completely to allow header compression of the end user IP packets directly on the backhaul link. The donor base station 18b includes a user terminal and bearer identifier within one of the radio interface user plane (UP) protocol layers to enable the mapping in the downlink at the relay 18a from the incoming backhaul radio bearer to a user terminal specific radio bearer and in the uplink at the base station 18b from a backhaul radio bearer to a user terminal specific GTP tunnel.

Two different approaches can be used to insert a user terminal and bearer identifier in the PDCP layer. In a first approach, a separate user terminal bearer identification field is introduced in the PDCP header. This field indicates which user terminal radio bearer the packet should be transmitted on by the relay 18a for downlink communications and which GTP tunnel the packet should be transmitted on by the base station 18b for uplink communications. In this approach, it is possible to either run a separate PDCP—machine (i.e. header (de)compression and (de)ciphering machines) per user terminal bearer (multiplexing below PDCP), or alternatively, run one PDCP machine per backhaul bearer (multiplexing above PDCP). This approach may require standardization changes to the PDCP protocol.

A second approach for inserting user terminal and bearer identifier into the PDCP layer is to reuse, in the backhaul link, the existing CID (Context Identifier) field in the header compression protocol as the user terminal bearer identification field to indicate which user terminal specific GTP tunnel (uplink) and radio bearer (downlink) a packet received on the backhaul link should be mapped to. The CID field in the header compression protocol is normally used to identify application flows. In this approach, the CID field is used in the header compression protocol on the backhaul link to identify user terminal radio bearers, which requires that different user terminal radio bearers/GTP tunnels are always assigned different CID values (~65000 values are possible). The mapping between user terminal radio bearers/GTP tunnels and CIDs could either be hard coded e.g. RB id 1 uses CID 1-20, or it can be explicitly signaled between the relay 18a and the base station 18b, or it can be configured using operation and maintenance system. Possible signaling protocols include S1/X2 and RRC signaling. An alternative to hard coding and explicit signaling is to assign the CID <-> RB/GTP mapping implicitly, e.g. based on the order the bearers are setup or some other scheme. The advantage of this approach is that it does not mandate standardization changes to the PDCP protocol.

In case there is one PDCP machine per user terminal bearer in the donor base station 18b (i.e., multiplexing is done below PDCP), meaning that the ciphering and the header compression are performed independently for each user terminal bearer at the donor base station 18b, the relay 18a may omit deciphering/decompression when forwarding between the backhaul radio link and the user terminal radio link. Instead, the relay 18a node can simply map and forward the PDCP PDUs between the incoming and the outgoing bearers without any further PDCP processing.

As previously noted, the user terminal and bearer identifier can also be inserted into RLC layer signaling. With this approach, a separate user terminal bearer identification field is introduced in the RLC header. This field indicates which user terminal radio bearer the packet should be transmitted on by the relay 18a (downlink) or which GTP tunnel the packet should be transmitted on by the base station 18b (uplink). This approach assumes that a separate PDCP-machine (i.e. header (de)compression and (de)ciphering machines) and possible RLC machine is used per user terminal bearer (multiplexing below PDCP or RLC). This solution may require standardization changes to the RLC protocol.

It should be noted that one RLC PDU may contain upper layer packets concatenated from different user terminal radio bearers. Therefore, the RLC header should have as many user terminal bearer identification fields as the number of upper layer PDUs concatenated from different user terminals 20 in the RLC PDU. In order to keep header size small, it should be possible to set dynamically the size of the user terminal bearer identification field in each RLC PDU depending on the particular upper layer PDUs concatenated.

The user terminal specific bearer identifier can also be inserted into MAC layer signaling. In this approach, a separate user terminal radio bearer identification field is introduced in the MAC header. Introducing the new field in the MAC header can be solved by extending the existing logical channel identifier field (LCID) in the MAC header with a UE specific terminal identifier. This field indicates which user terminal radio bearer the packet should be transmitted on by the relay 18a (downlink) and which GTP tunnel the packet should be transmitted on by the base station 18b (uplink). This solution assumes that a separate PDCP-machine (i.e. header (de)compression and (de)ciphering machines) and RLC machine be run per user terminal bearer (multiplexing is performed on MAC layers). This approach may require standardization changes to the MAC protocol.

It should be noted that one MAC PDU may contain upper layer packets multiplexed from different user terminal radio bearers. Therefore, the MAC header would need to hold as many user terminal bearer identification fields as the number of upper layer PDUs multiplexed from different user terminals 20 into the given MAC PDU. In order to save header space, it should be possible to set dynamically the size of the user terminal bearer identification field in each MAC PDU depending on the particular upper layer PDUs multiplexed.

Figure 4:
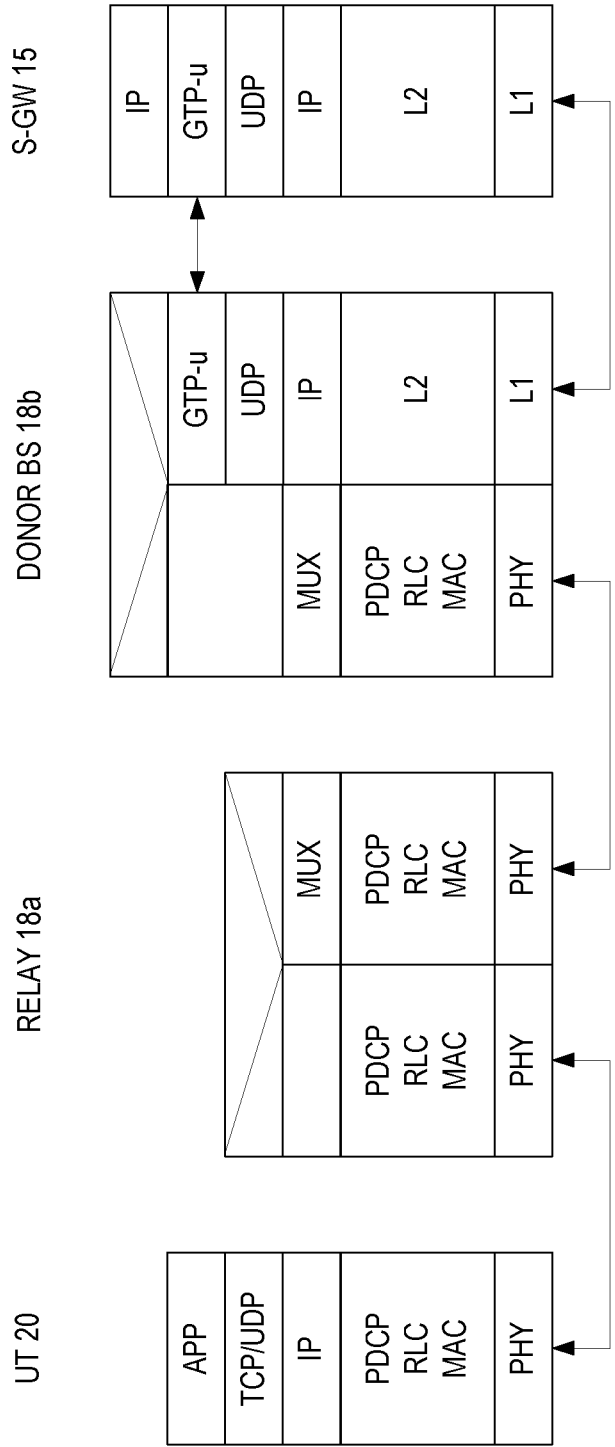
FIG. 4 illustrates an exemplary protocol architecture for a multi-hop communication system wherein user-specific bearer information is contained in a protocol layer above the PDCP layer.

In a second embodiment of the present invention illustrated in FIG. 4, user terminal and bearer identification is enabled by introducing an additional UP protocol layer above the PDCP layer that replaces the GTP and associated UDP/IP headers with a specific bearer identification field in order to reduce the overhead associated with these headers. In order to further reduce the overhead, it is useful to allow header compression of the end user packets. Header compression may be performed in the new UP protocol layer. Alternatively, header compression may be performed by the PDCP layer of the backhaul link assuming the bearer identification field can be passed transparently through the header compression.

Header compression in the new UP protocol layer avoids the need to perform header compression in the PDCP layer of the backhaul link. Consequently, the bearer identity field can be transferred as a part of the header compression header. This approach is similar to the first embodiment using the PDCP layer to transmit user terminal and bearer identification. The difference is that the existing PDCP layer of the backhaul link does not need to be modified in this approach.

If header compression is performed in the PDCP layer, the PDCP layer should ignore the bearer identification field added by the higher layer. One approach to this problem is to explicitly configure the PDCP layer to ignore the first of last N bytes, which carry the user terminal and bearer identification. Alternatively, the user terminal and bearer identification can be attached as a trailer (at the end) of the IP packets. In general, the trailer is ignored by the header compression algorithm, which is more interested in the beginning of the packet. This assumes that the header compression algorithm does not rely on the IP packet length. In case the header compression algorithm relies on IP packet length, it may be required that the upper layer modifies the IP length field (e.g. by adding a fixed number of bytes) and other fields such as IP checksum, TCP/UDP length fields etc.

In the second embodiment, all multiplexing of different user terminal bearers is performed above PDCP meaning that the PDCP entity is per backhaul bearer (not per user terminal bearer).

Figure 5:
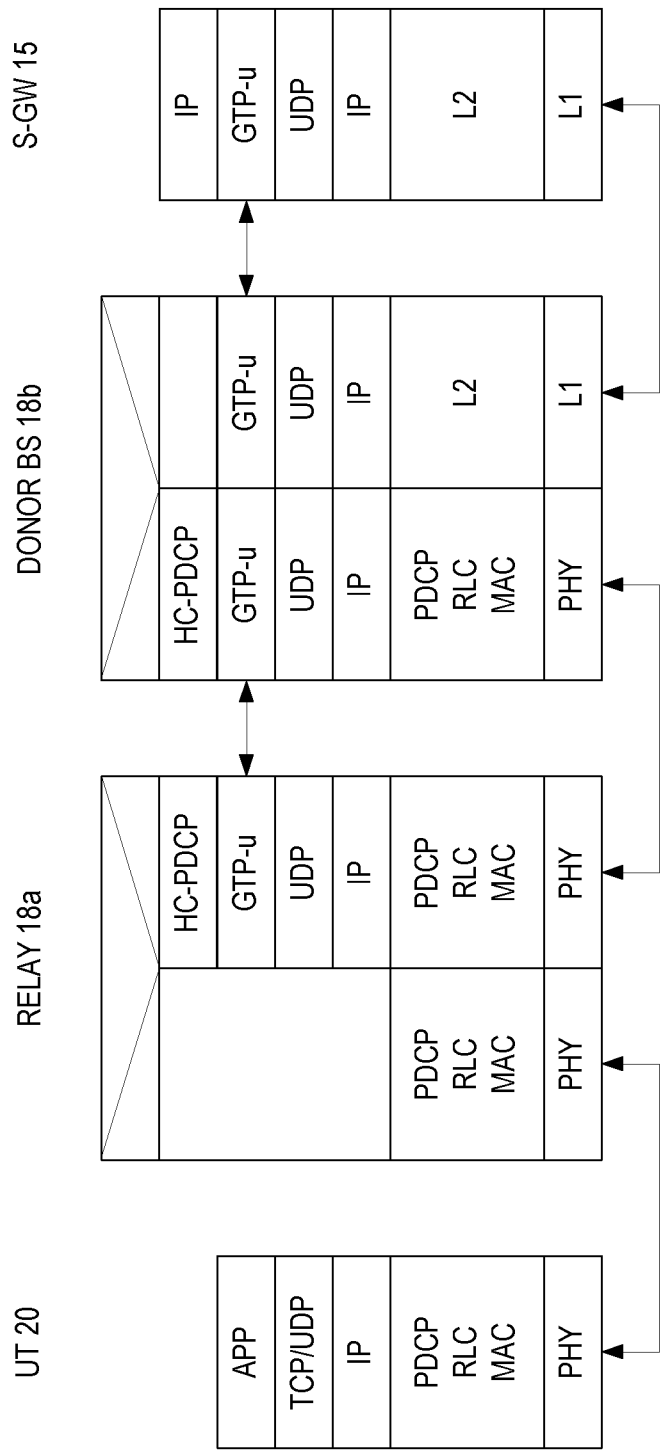
FIG. 5 illustrates an exemplary protocol architecture for a multi-hop communication system wherein user-specific bearer information is contained in a header compression layer in the GTP tunnel between the donor base station and the relay.

In a third embodiment illustrated in FIG. 5, user terminal and bearer identification is enabled by introducing a header compression layer within the GTP tunnel which will compress the end user IP packets. More particularly, a header compression PDCP layer (HC-PDCP) is introduced for compressing the GTP-u header. It is noted that the additional header compression layer does not necessarily mean new protocol headers, such as, PDCP headers. In the typical embodiment, this would be realized by running plain IP header compressors (e.g., RoHC) on the two ends of the link, which replace fields of the IP header (or parts of it) with their compressed form. In this embodiment, the GTP-u and associated UDP/IP headers can be kept since the HC-PDCP entities on the backhaul link will compress the GTP/UDP/IP headers. The relay 18a can rely on the GTP-u header to determine the mapping between GTP tunnels and user terminal radio bearers. Possible protocols to configure the header compression within the GTP tunnel could be GTP-c or RRC signaling or S1 signaling.

Another potential alternative for this embodiment is to omit the additional header compression layer (HC-PDCP) in the GTP tunnel and extend the header compression profiles of the backhaul link PDCP protocol such that it can handle the compression of the GTP/UDP/IP tunnel headers and the end user IP protocol headers together. This would require new compression profiles for the RoHC (Robust Header Compression) header compression algorithm, which can handle the GTP and the (end user) TCP/UDP headers as extension headers during the compression.

Those skilled in the art will appreciate that the network 10 nodes illustrated in FIGS. 2-5 may comprise specially programmed computer systems programmed to operate as hereinabove described. The computer systems may comprise one or more processors, microcontrollers, hardware, of a combination thereof along with memory for storing programming instructions and data needed for operation as described above.

Figure 6:
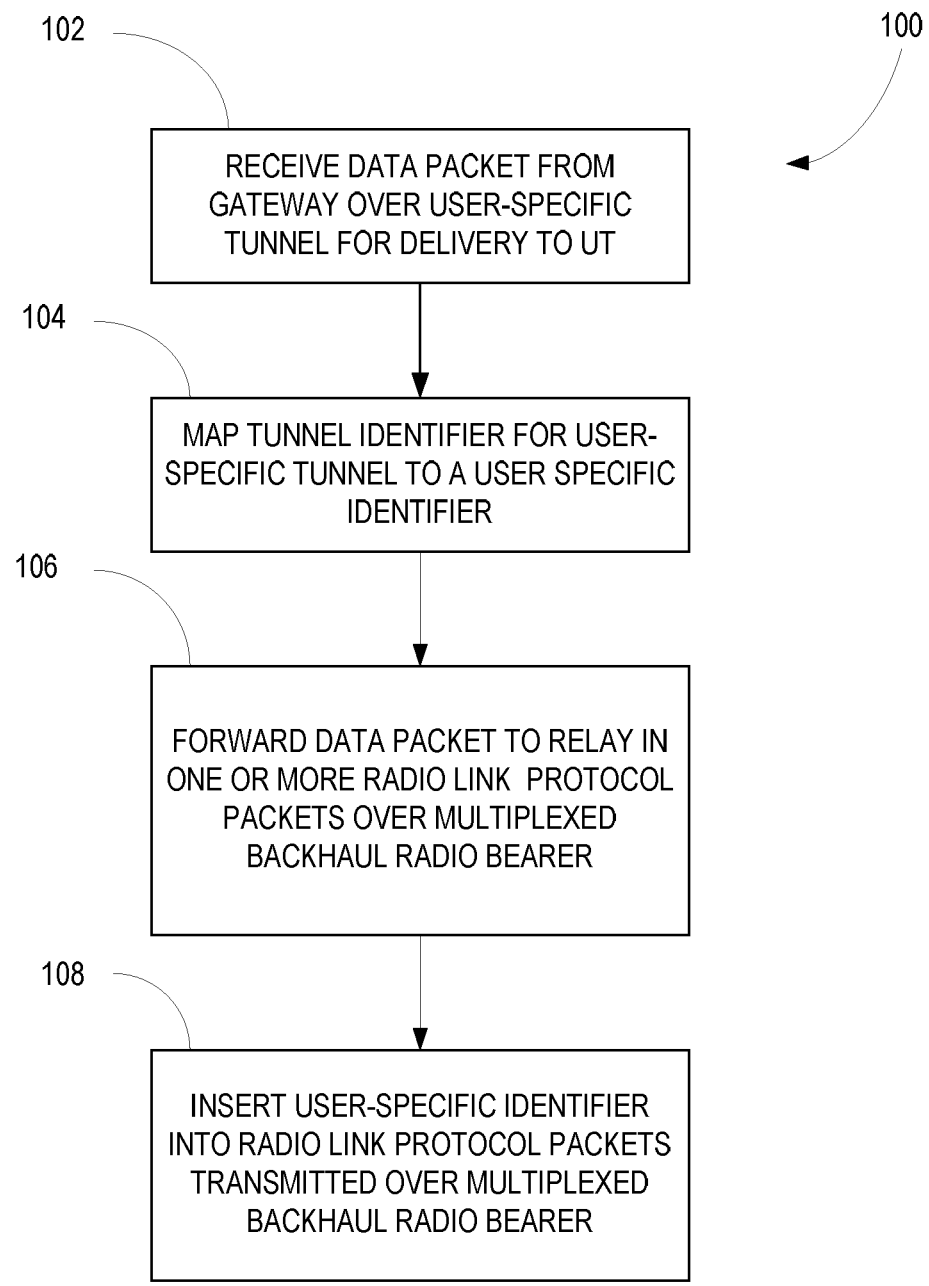
FIG. 6 illustrates an exemplary procedure implemented by a donor base station in a multi-hop communication system for inserting bearer identification information into downlink packets and forwarding downlink packets to a relay for transmission to a user terminal by the relay.
Figure 7:
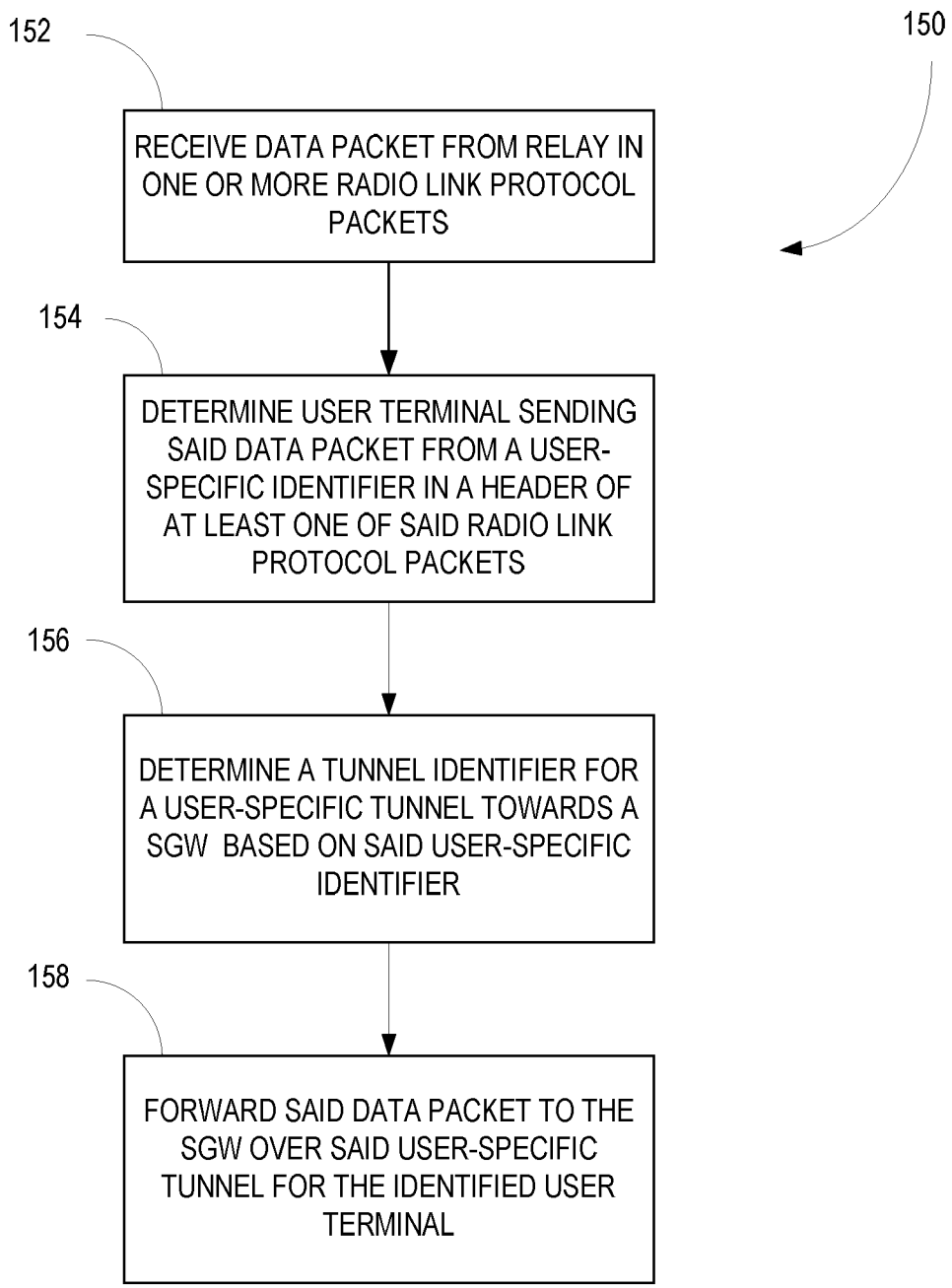
FIG. 7 illustrates an exemplary procedure implemented by a donor base station in a multi-hop communication system for mapping and forwarding uplink packets received from a relay to a serving gateway in the core network.

FIGS. 6 and 7 illustrate the operation of a donor base station 18b in one exemplary embodiment of the invention. In this embodiment, identifying information is inserted into radio link protocol packets transmitted over the multiplexed backhaul link between the donor base station 18b and relay 18a.

FIG. 6 illustrates an exemplary procedure 100 implemented by the donor base station 18b for forwarding downlink packets intended for a user terminal 20. The procedure 100 begins when the donor base station 18b receives a data packet from the serving gateway 15 over a user specific tunnel for delivery to the user terminal 20 (block 102). The donor base station 18b maps the tunnel identifier for the user specific tunnel to a user specific identifier used on the link between the relay 18a and donor base station 18b (block 104), and forwards the data packet to the relay 18a over a multiplexed backhaul link in one or more radio link protocol packets (block 106). The base station 18b inserts the user-specific identifier into at least one of the radio link protocol packets to enable the relay 18a to identify the user terminal 20 for which the data packet is intended (block 108). As previously noted, the user specific identifier may comprise a user specific radio bearer identifier that identifies a specific radio bearer assigned to the user terminal. The user specific radio bearer identifier may be inserted into the PDCP header, RLC header, or MAC header of the radio link protocol packets. The relay 18a then forwards the packet to the user terminal 20 over the indicated user specific radio bearer.

FIG. 7 illustrates an exemplary procedure 150 implemented by the donor base station 18b for forwarding uplink packets received from the relay 18a to the serving gateway 15. The procedure 150 begins when the donor base station 18b receives a data packet from the relay 18a over a multiplexed backhaul link in one or more radio link protocol packets (block 152). Before transmitting the data packet, the relay 18a inserts a user specific identifier into at least one of the radio link protocol packets. The donor base station 18b determines the user terminals sending the data packet from a user specific identifier inserted into the header of at least one of the radio link protocol packets (block 154). The donor base station 18b determines a tunnel identifier for a user specific tunnel between the donor base station 18b and gateway 15 based on the user specific identifier (block 156) and forwards the data packet to the gateway 15 over the user specific tunnel for the identified user terminal (block 158).

Figure 8:
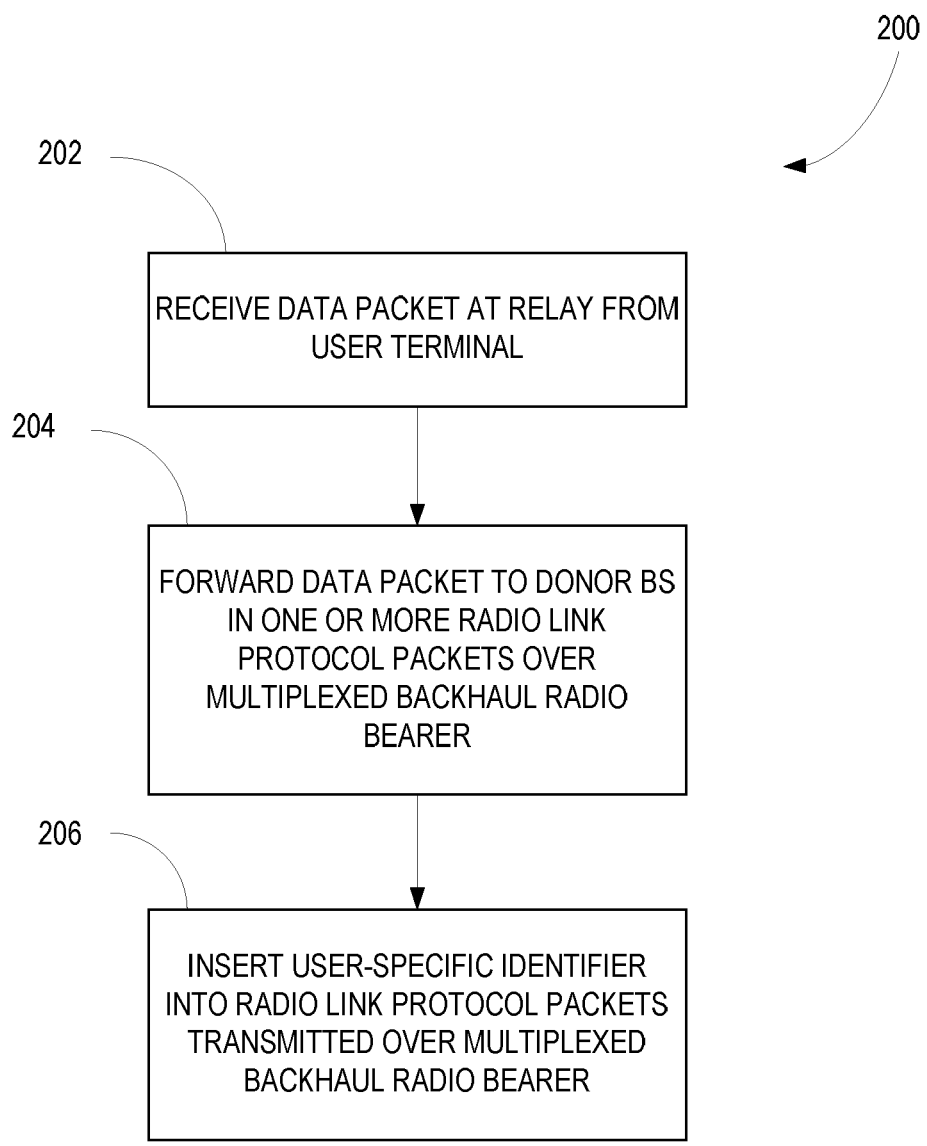
FIG. 8 illustrates an exemplary procedure implemented by a relay in a multi-hop communication system for inserting bearer identification information into uplink packets and forwarding uplink packets to a donor base station for transmission to a serving gateway in a core network.
Figure 9:
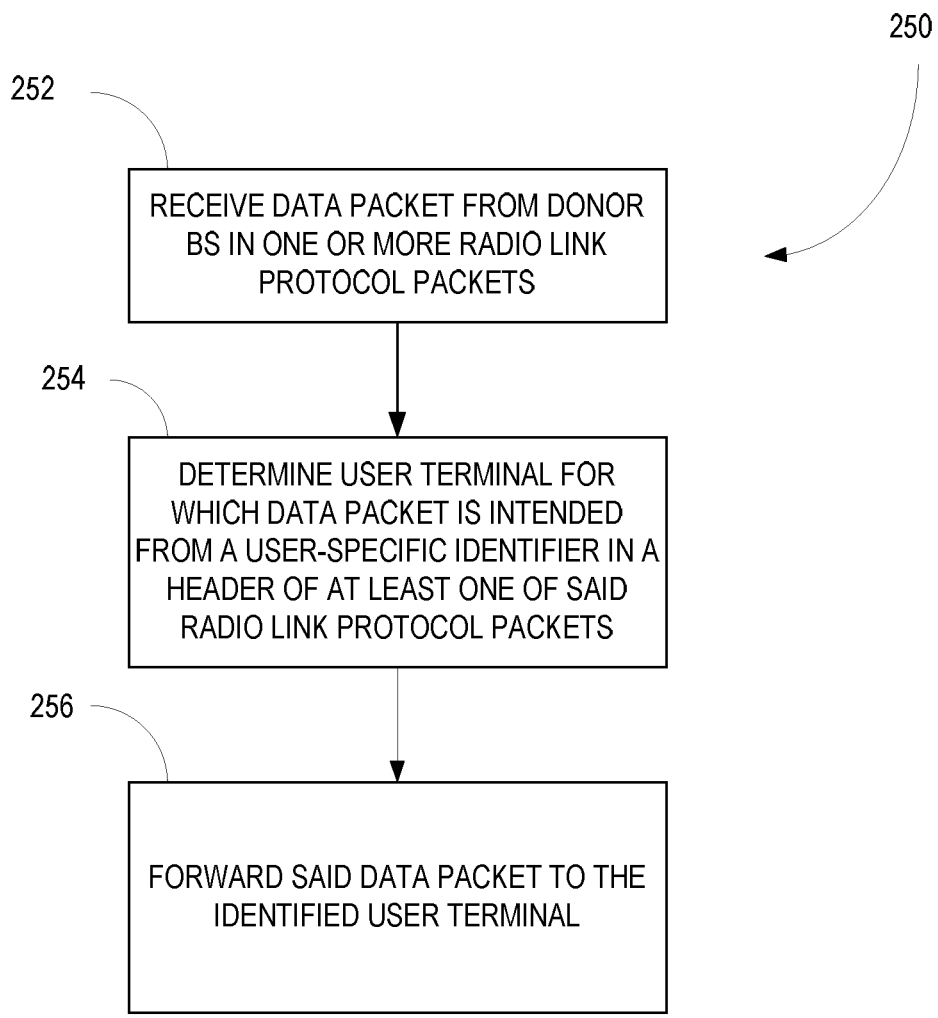
FIG. 9 illustrates an exemplary procedure implemented by a relay in a multi-hop communication system for forwarding downlink packets received from a donor base station to a user terminal.

FIGS. 8 and 9 illustrate the operation of a relay 18a in one exemplary embodiment of the invention. In this embodiment, identifying information is inserted into radio link protocol packets transmitted over the multiplexed backhaul link between the donor base station 18b and relay 18a.

FIG. 8 illustrates an exemplary procedure 200 for forwarding downlink packets received from a donor base station 18b to a user terminal 20. The procedure 200 begins when the relay 18a receives a data packet from a user terminal 20 (block 202). The relay 18a forwards the data packet to the donor base station 18b over a multiplexed backhaul link in one or more radio link protocol packets (block 204). The relay 18a inserts the user-specific identifier into at least one of the radio link protocol packets to enable the donor base station 18b to identify the user terminal for which the data packet is intended (block 206). As previously noted, the user specific identifier may comprise a user specific radio bearer identifier that identifies a specific radio bearer assigned to the user terminal. The user specific radio bearer identifier may be inserted into the PDCP header, RLC header, or MAC header of the radio link protocol packets.

The donor base station 18b then forwards the packet to the serving gateway 15. FIG. 9 illustrates an exemplary procedure 250 implemented by the relay 18a for forwarding down link packets received from the donor base station 18b to the user terminal 20. The procedure 250 begins when the relay 18a receives a data packet from the donor base station 18b over a multiplexed backhaul link in one or more radio link protocol packets (block 252). Before transmitting the data packet, the relay 18a inserts a user specific identifier into at least one of the radio link protocol packets. The donor relay 18a determines the user terminal to receive the data packet from a user specific identifier inserted into the header of at least one of the radio link protocol packets (block 254) and forwards the data packet to the identified user terminal (block 256).

Figure 10:
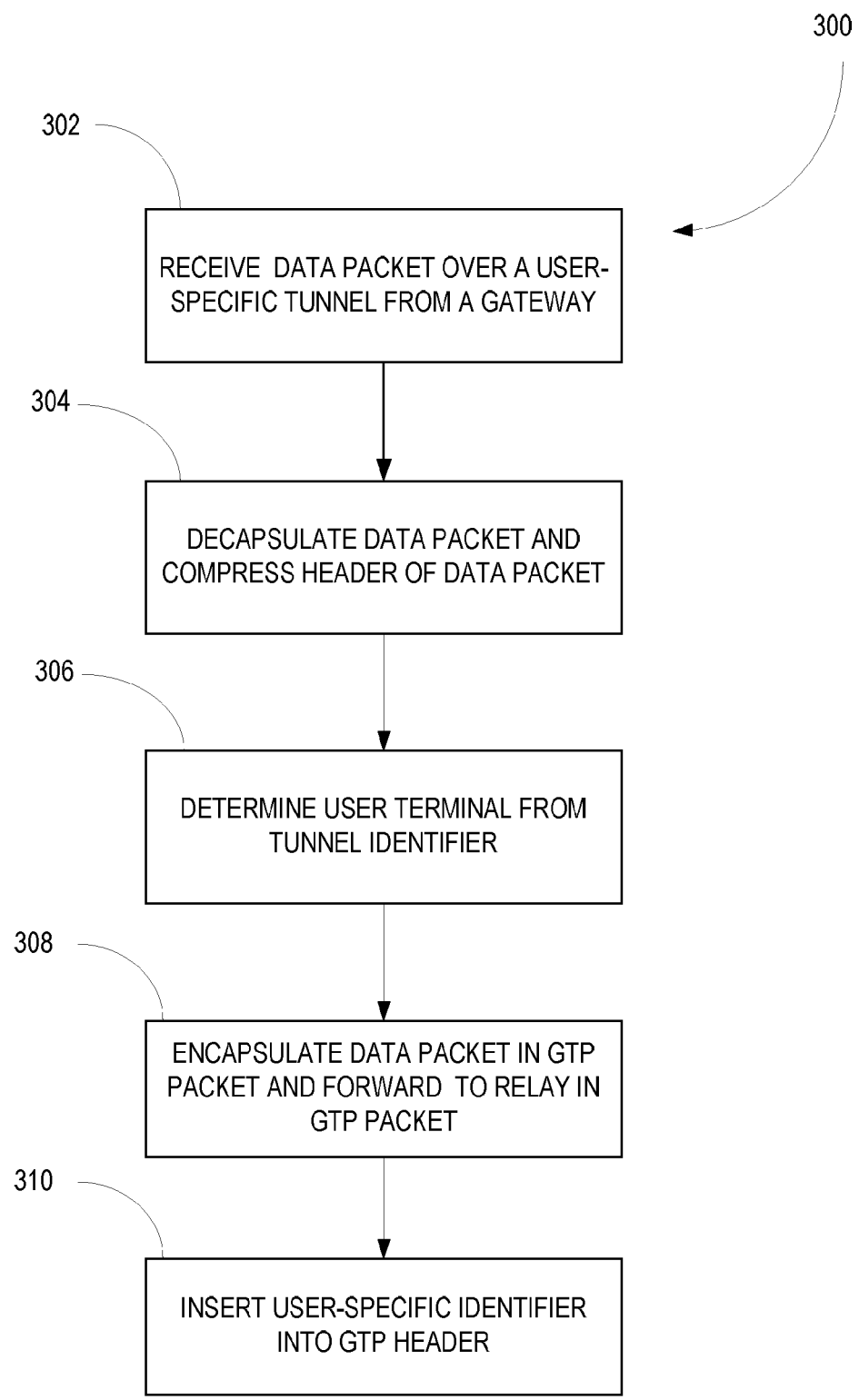
FIG. 10 illustrates an exemplary procedure implemented by a donor base station in a multi-hop communication system for compressing and forwarding downlink packets to a relay for transmission to a user terminal by the relay.
Figure 11:
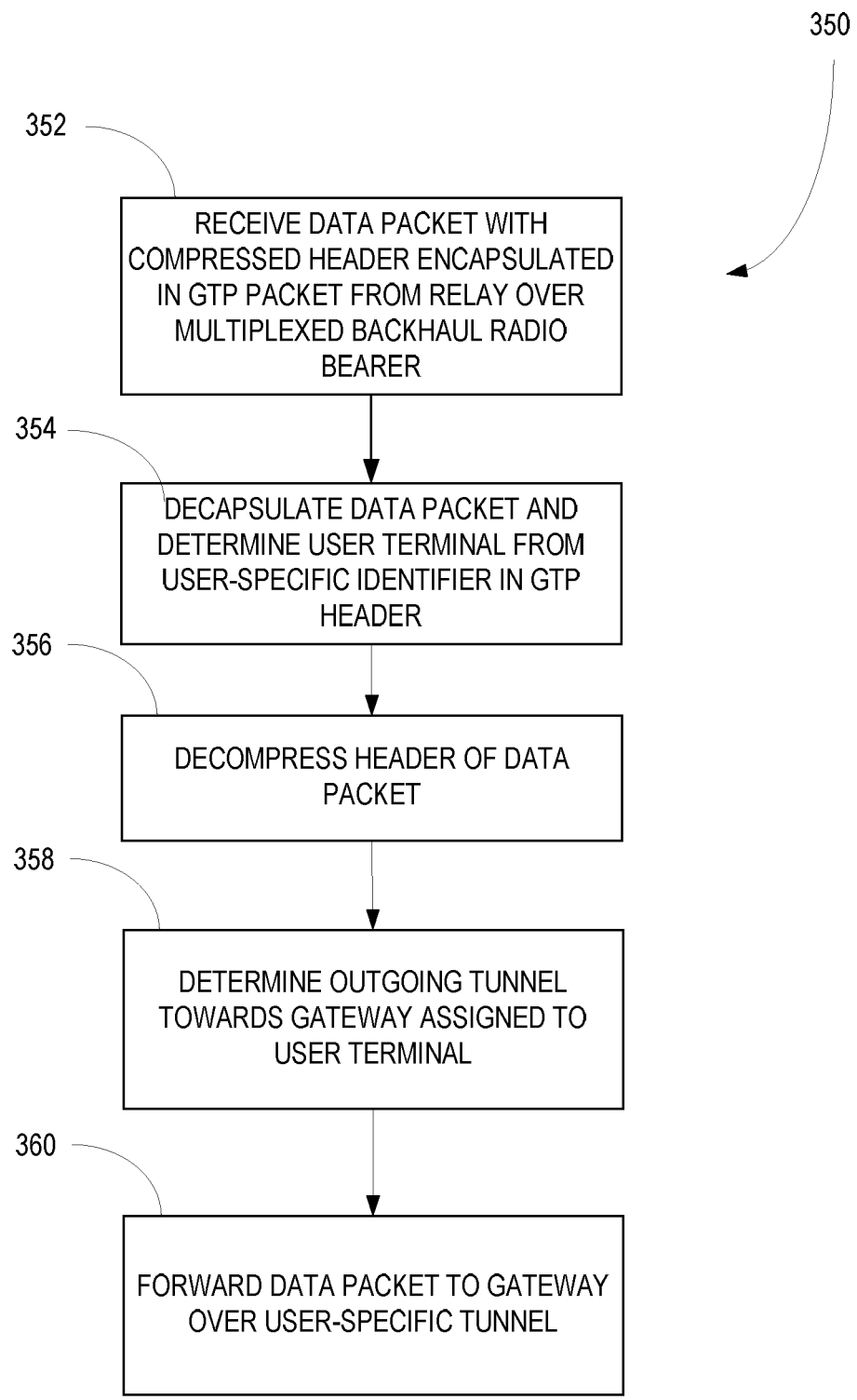
FIG. 11 illustrates an exemplary procedure implemented by a donor base station in a multi-hop communication system for decompressing and forwarding uplink packets received from a relay to a serving gateway in the core network.

FIGS. 10 and 11 illustrate the operation of a donor base station 18b in an alternate embodiment of the invention. In this embodiment, the tunneling header of the data packets transmitted over a user specific tunnel from the serving gateway 15 are compressed for transmission over the backhaul link between the donor base station 18b and relay 18a.

FIG. 10 illustrates an exemplary procedure 300 implemented by the donor base station 18b for forwarding packets received from the serving gateway 15 to the relay 18a. The procedure 300 begins when the donor base station 18b receives a packet over a GTP tunnel from the serving gateway 15 (block 302). The donor base station 18b decapsulates the data packet and compresses the header (block 304). The donor base station determines the user terminal for which the data packet is intended from the tunnel ID of the GTP-u header received from the gateway 15 and maps the data packet received over the incoming tunnel from the serving gateway 15 to an outgoing tunnel toward the relay 18a (block 306). The donor base station 18b encapsulates the compressed data packet in a tunneling packet and forwards the data packet to the relay 18a (block 308). The outgoing tunnel is a user specific tunnel in a multiplexed backhaul link between the donor base station 18b and relay 18a. Prior to transmission to the relay 18a, the donor base station 18b inserts a user-specific identifier into the tunneling header to enable the relay to identify the user terminal 20 (block 310).

FIG. 11 illustrates an exemplary procedure 350 implemented by the donor base station 18b for forwarding uplink packets received from the relay 18a over the backhaul link to the serving gateway 15. The procedure 350 begins when the donor base station 18b receives a data packet from the relay 18a over the backhaul radio bearer (block 352). In this embodiment, it is presumed that a tunneling protocol, such as GTP, is used for the transmission of data packets over the backhaul link and that the header of the data packet is compressed by the relay 18a prior to transmission. After receiving the data packet, the donor base station 18b decapsulates the compressed data packet (block 354) and decompresses the header of the data packet (block 356). The donor base station 18b determines the outgoing tunnel toward the serving gateway 15 (block 358), and forwards the data packet over a user specific tunnel between the donor base station 18b and serving gateway 15 (block 360). The donor base station may determine the outgoing tunnel from a user-specific identifier contained in the GTP-u header received from the relay 18a.

Figure 12:
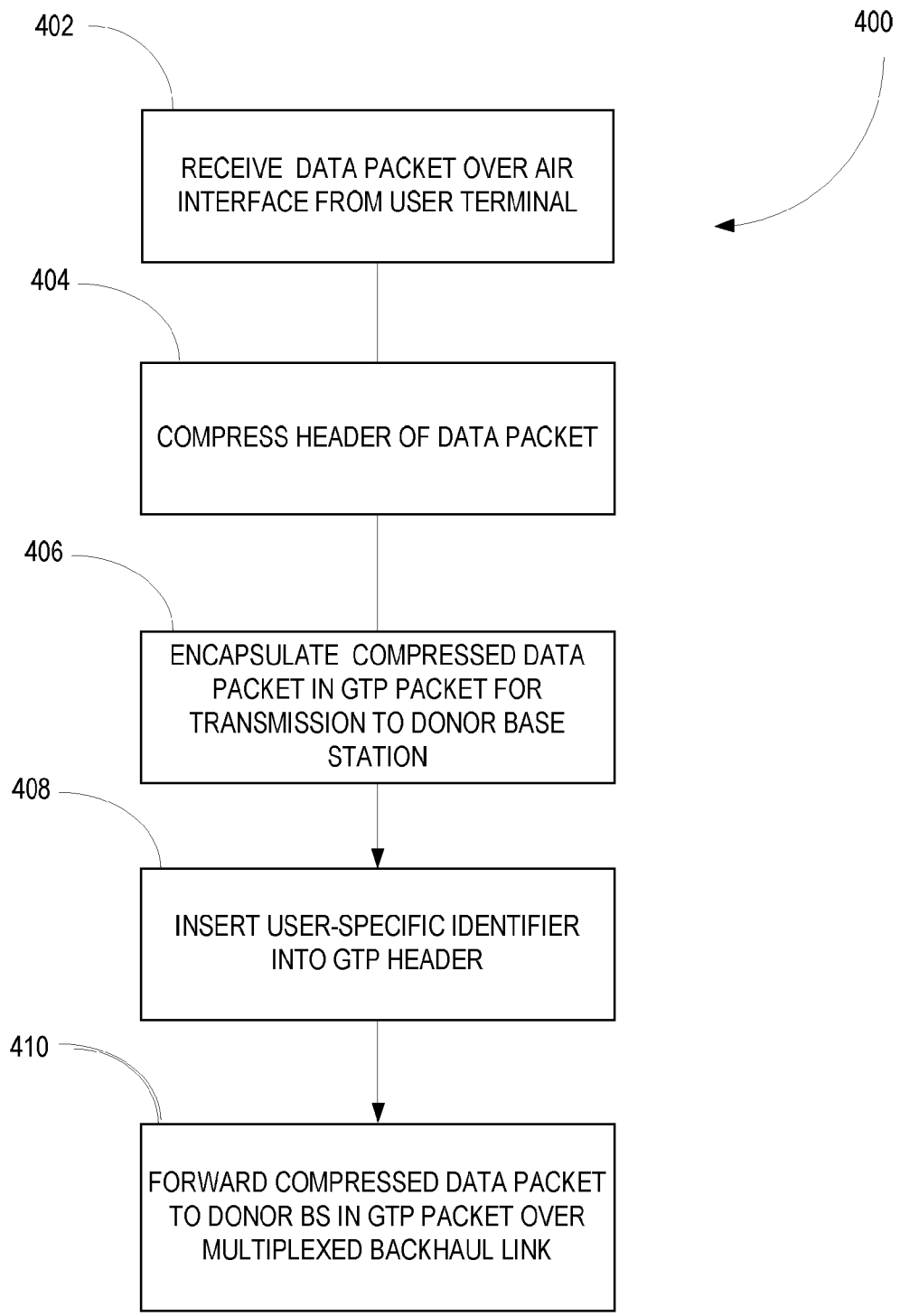
FIG. 12 illustrates an exemplary procedure implemented by a relay in a multi-hop communication system for compressing and forwarding uplink packets to a donor base station for transmission to a serving gateway.

FIG. 12 illustrates an exemplary procedure implemented by a relay 18a in a multi-hop communication system for compressing and forwarding uplink packets to a donor base station 18b for transmission to a serving gateway. The procedure begins when the relay 18a receives a data packet over the air interface from a user terminal 20 (block 402). The relay 18a compresses the header of the data packet (block 404) and encapsulates the data packet in a GTP packet for transmission to the donor base station 18b (block 406). The relay 18a inserts a user-specific identifier into the GTP header (block 408) and forwards the encapsulated and compressed data packet to the donor base station 18b (block 410).

Figure 13:
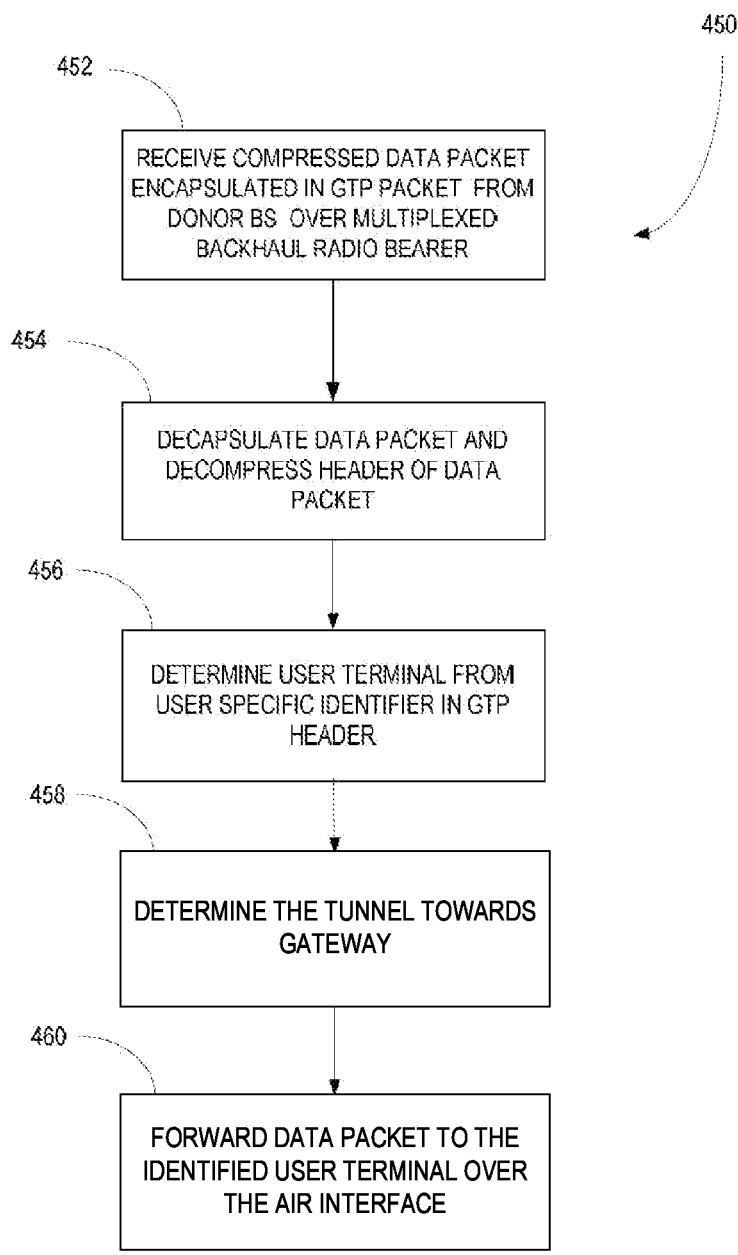
FIG. 13 illustrates an exemplary procedure implemented by a relay in a multi-hop communication system for decompressing and forwarding downlink packets received from a donor base station to a user terminal.

FIG. 13 illustrates an exemplary procedure 450 implemented by a relay 18a in a multi-hop communication system for decompressing and forwarding downlink packets received from a donor base station to a user terminal. The relay 18a receives a data packet from the donor base station over encapsulated in a GTP packet (block 452). The relay 18a decapsulates the data packet and decompresses the header of the data packet (block 454). The donor base station 18b determines the user terminal 20 sending the data packet from the GTP header (block 456), and the corresponding tunnel towards the gateway 15 (block 458). The donor base station 18b then forwards the decompressed data packet to the identified user terminal 20 over the air interface (block 460).

Figure 14:
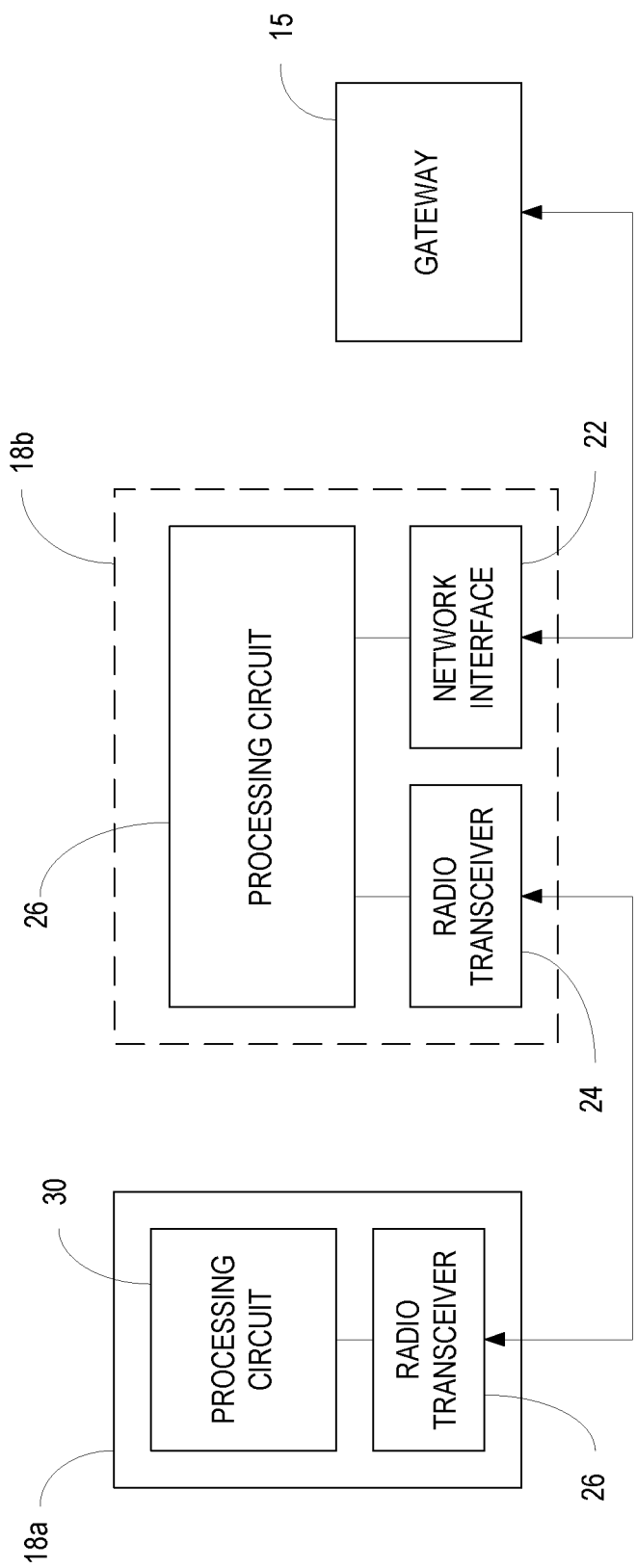
FIG. 14 illustrates an exemplary donor base station and relay for a multi-hop communication system.

FIG. 14 illustrates an exemplary base station 18b and relay 18a in a multi-hop communication system. The base station 18b comprises a network interface 22 for communicating with the serving gateway 15, a radio transceiver 24 for communicating over a wireless backhaul link with the relay 18a, and a processing circuit 26 for implementing the packet forwarding protocols as herein described. The network interface 22 may, for example, comprise an Ethernet interface. The radio transceiver 24 may be configured to implement known wireless communication protocols, such as LTE, WCDMA, and WiMAX, without modifications for the backhaul link. The processing circuit 26 comprises one or more processors, hardware, or a combination thereof, and memory for implementing the forwarding procedures as shown in FIGS. 6-7 and 10-11. The relay 18a also includes a radio transceiver 28 and a processing circuit 30. The transceiver is used both for communications with the donor base station 18b and the user terminal. The processing circuit 30 comprises one or more processors, hardware, or a combination thereof, and memory for implementing the forwarding procedures as shown in FIGS. 7-8, and 12-13.

LTE Release 10 is likely to include a self backhauling solution, in which case a low overhead on the backhaul link is desirable. The exemplary embodiments of the invention reduce the protocol overhead when applied to a self backhauling or relaying solution in a LTE system. This implies a more efficient utilization of the radio resource and hence improved system performance. The magnitude of the gain realized by reducing overhead is related to the packet size. When transmitting very large packets, some additional bits do not affect so much. However, for services like VoIP with smaller IP packets, the gain is significant.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method in a donor base station for multiplexing data packets for a plurality of user terminals over a single radio bearer on a backhaul between the donor base station and a relay in a multi-hop communication system, said method comprising:
  receiving, by said donor base station over a user-specific tunneling connection with a gateway, an incoming tunneling packet including an incoming tunneling header and an encapsulated data packet for delivery to one of said user terminals;
  decapsulating, by said donor base station, the data packet from the tunneling packet by removing the incoming tunneling header;
  compressing, by said donor base station, a header of the data packet;
  identifying, by the donor base station, a user terminal for which the data packet is intended from a tunnel ID in the incoming tunneling header;
  encapsulating, by the donor base station, the data packet having the compressed header in an outgoing tunneling packet by adding an outgoing tunneling header; and
  forwarding said data packet having the compressed header from said donor base station to said relay over a multiplexed backhaul radio bearer over a user-specific tunnel for said user terminal.

2. A method in a donor base station for multiplexing packets for a plurality of user terminals over a single radio bearer on a backhaul between donor base station and a relay in a multi-hop communication system, said method comprising:
  receiving, by said donor base station, an incoming tunneling packet including a data packet having a compressed header from a relay over a multiplexed backhaul radio bearer;
  decapsulating, by said donor base station, the data packet from the incoming tunneling packet by removing an incoming tunneling header;
  identifying, by the donor base station, a user terminal at which the data packet originated from a user-specific identifier in the incoming tunneling header;
  decompressing, by said donor base station, the header of said data packet;
  encapsulating, by said donor base station, said data packet having the decompressed header in an outgoing tunneling packet; and
  forwarding said outgoing tunneling packet from the donor base station to a gateway assigned to the identified user terminal via a user-specific tunnel corresponding to the identified user terminal.

3. A method in a relay for multiplexing packets for a plurality of user terminals over a single radio bearer on a backhaul between a donor base station and the relay in a multi-hop communication system, said method comprising:
  receiving, by said relay, a data packet from one of said user terminals;
  compressing, by said relay, a header of said data packet;
  encapsulating, by said relay, said data packet in a tunneling packet by adding a tunneling header;

inserting, by said relay, a user-specific identifier into the tunneling header of the tunneling packet; and forwarding said data packet having the compressed header from said relay to the donor base station in one or more radio link protocol packets through a tunnel in a multiplexed backhaul radio bearer.

4. A method in a relay for multiplexing packets for a plurality of user terminals over a single radio bearer on a backhaul between a donor base station and the relay in a multi-hop communication system, said method comprising:

receiving, by said relay, a tunneling packet from a donor base station over a multiplexed backhaul radio bearer, wherein the tunneling packet including a data packet intended for delivery to one of the user terminals, and wherein the data packet having a compressed header;

decapsulating, by said relay, said data packet from said tunneling packet by removing a tunneling header;

decompressing, by said relay, said header of said data packet;

identifying, by said relay, a user terminal for which the data packet is intended from a user-specific identifier inserted into the tunneling header of said tunneling packet by said donor base station; and forwarding said decompressed data packet from the relay to said user terminal.

5. A donor base station for multiplexing data packets for a plurality of user terminals over a single radio bearer on a backhaul between the donor base station and a relay in a multi-hop communication system, the donor base station comprising a processing circuit, a radio transceiver, and a network interface, wherein the processing circuit is configured to:

receive, over a user-specific tunneling connection with a gateway, an incoming tunneling packet including an incoming tunneling header and an encapsulated data packet for delivery to one of said user terminals;

decapsulate the data packet from the tunneling packet by removing the incoming tunneling header;

compress a header of the data packet;

identify a user terminal for which the data packet is intended from a tunnel ID in the incoming tunneling header;

encapsulate the data packet having the compressed header in an outgoing tunneling packet by adding an outgoing tunneling header; and forward said data packet having the compressed header from said donor base station to said relay over a multiplexed backhaul radio bearer over a user-specific tunnel for said user terminal.

6. A donor base station for multiplexing packets for a plurality of user terminals over a single radio bearer on a backhaul between the donor base station and a relay in a multi-hop communication system, the donor base station comprising a processing circuit, a radio transceiver, and a network interface, wherein the processing circuit is configured to:

receive an incoming tunneling packet including a data packet having a compressed header from a relay over a multiplexed backhaul radio bearer;

decapsulate the data packet from the incoming tunneling packet by removing an incoming tunneling header;

identify a user terminal at which the data packet originated from a user-specific identifier in the incoming tunneling header;

decompress the header of said data packet;

encapsulate said data packet having the decompressed header in an outgoing tunneling packet; and forwarding said outgoing tunneling packet to a gateway assigned to the identified user terminal via a user-specific tunnel corresponding to the identified user terminal.

7. A relay for multiplexing packets for a plurality of user terminals over a single radio bearer on a backhaul between a donor base station and said relay in a multi-hop communication system, wherein the relay comprises a radio transceiver and a processing circuit, wherein the processing circuit is configured to:

receive a data packet from one of said user terminals;

compress a header of said data packet; and encapsulate said data packet in a tunneling packet by adding a tunneling header;

insert a user-specific identifier into the tunneling header of said tunneling packet; and forward said data packet having the compressed header from said relay to a donor base station in one or more radio link protocol packets through a tunnel in a multiplexed backhaul radio bearer.

8. A relay for multiplexing packets for a plurality of user terminals over a single radio bearer on a backhaul between a donor base station and said relay in a multi-hop communication system, wherein the relay comprises a radio transceiver and a processing circuit, wherein the processing circuit is configured to:

receive a tunneling packet from a donor base station over a multiplexed backhaul radio bearer, wherein the tunneling packet including a data packet intended for delivery to one of the user terminals, and wherein the data packet having a compressed header;

decapsulate said data packet from said tunneling packet by removing a tunneling header;

decompress said header of said data packet; and identify a user terminal for which the data packet is intended from a user-specific identifier inserted into the tunneling header of said tunneling packet by said donor base station; and forward said decompressed data packet to said user terminal.

* * * * *

UNITED STATES PATENT AND TRADEMARK OFFICE
CERTIFICATE OF CORRECTION

PATENT NO.         : 8,971,233 B2                                Page 1 of 1
APPLICATION NO.    : 13/257540
DATED              : March 3, 2015
INVENTOR(S)        : Moberg et al.

It is certified that error appears in the above-identified patent and that said Letters Patent is hereby corrected as shown below:

In the Specification

In Column 8, Line 64, delete "station 18a" and insert -- station 18b --, therefor.

Signed and Sealed this
Eighteenth Day of August, 2015

Michelle K. Lee
*Director of the United States Patent and Trademark Office*